(12) United States Patent
Christou et al.

(10) Patent No.: US 7,361,615 B2
(45) Date of Patent: Apr. 22, 2008

(54) MESH SUITABLE FOR USE AS A LIGHT ATTENUATING SCREEN AND METHOD FOR MAKING THE SAME

(75) Inventors: Philippe Christou, Saint Clair de la Tour (FR); Martine Pellet, Saint Jean de Boumay (FR); Alain Crouzet, Le Touvet (FR)

(73) Assignee: XLScreen (FR)

( * ) Notice: Subject to any disclaimer, the term of this patent is extended or adjusted under 35 U.S.C. 154(b) by 87 days.

(21) Appl. No.: 11/020,305

(22) Filed: Dec. 23, 2004

(65) Prior Publication Data

US 2005/0159058 A1    Jul. 21, 2005

(30) Foreign Application Priority Data

Dec. 23, 2003    (FR) ................................ 03 15269

(51) Int. Cl.
*D03D 9/00* (2006.01)
*B32B 27/04* (2006.01)
*B32B 27/12* (2006.01)

(52) U.S. Cl. .......................... 442/20; 442/29; 442/43; 442/44; 442/45; 428/920; 428/921

(58) Field of Classification Search ................ 442/20, 442/29, 43, 44, 45; 428/920, 921
See application file for complete search history.

(56) References Cited

U.S. PATENT DOCUMENTS

| 4,677,016 A | * | 6/1987 | Ferziger et al. ............. 428/212 |
| 4,690,859 A | | 9/1987 | Porter et al. |
| 5,607,758 A | * | 3/1997 | Schwartz ..................... 442/67 |
| 7,033,963 B2 | * | 4/2006 | Felegi et al. .................. 442/44 |
| 2005/0282449 A1 | * | 12/2005 | Mehta et al. ................. 442/35 |

FOREIGN PATENT DOCUMENTS

| AU | 8767882 | * | 2/1987 |
| EP | 0 669 418 A1 | | 8/1995 |
| EP | 0 861 814 A2 | | 9/1998 |
| WO | WO 99/43879 | | 9/1999 |

* cited by examiner

*Primary Examiner*—Ula C Ruddock
(74) *Attorney, Agent, or Firm*—Withers & Keys, LLC

(57) ABSTRACT

A mesh suitable for use as a light attenuating screen is disclosed. The mesh may contain not less than two sheets of glass yarn, joined to form a mesh having a specific openness factor and coated with a polymer coating containing $TiO_2$ particles, so that the glass yarn is separated from $TiO_2$ particles by at least a portion of the polymer binder. A method for making a mesh suitable for use as a light attenuating screen is also disclosed.

39 Claims, 1 Drawing Sheet

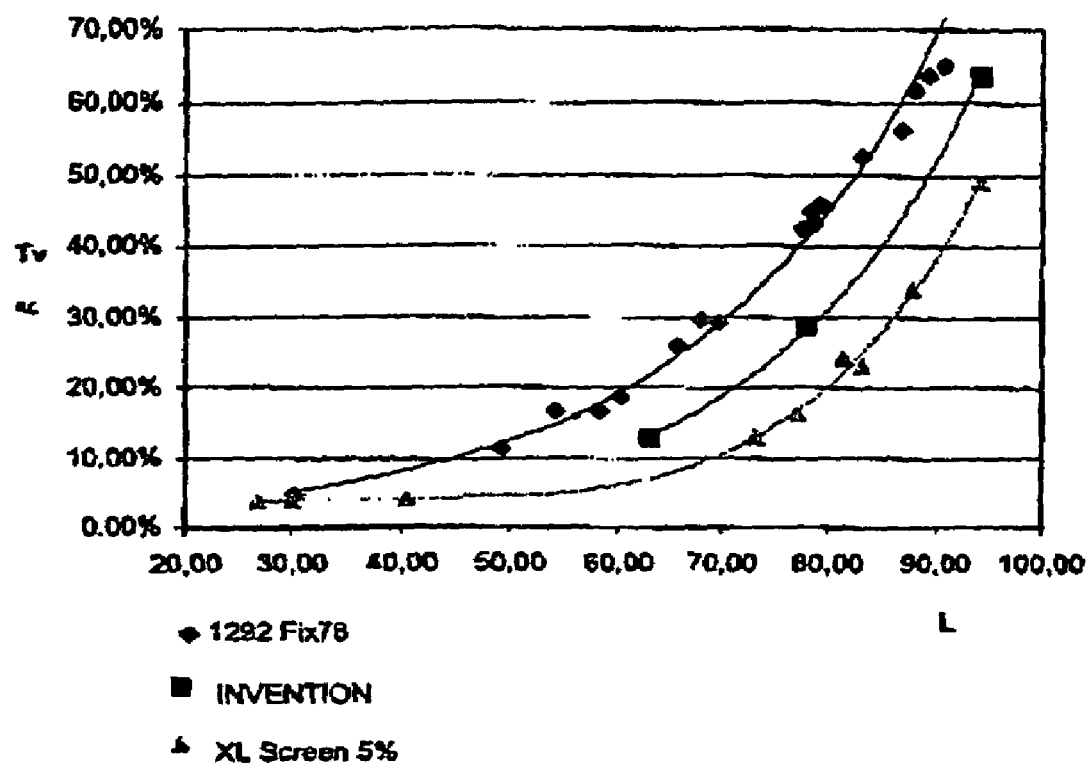
FIGURE UNIQUE

MESH SUITABLE FOR USE AS A LIGHT ATTENUATING SCREEN AND METHOD FOR MAKING THE SAME

CROSS-REFERENCE TO RELATED APPLICATIONS

This patent application claims the benefit of priority to French Patent Application Number 0315269 entitled "MESH FOR CONSTITUTING LIGHT ATTENUATING SCREENS AND METHOD FOR PRODUCING SAME" filed on Dec. 23, 2003 in the name of HEXYL FABRICS, Society Anodyne, the subject matter of which is incorporated herein in its entirety.

TECHNICAL FIELD OF THE INVENTION

This invention relates to the field of meshes of yarn woven so as to have a specific openness factor, used for producing curtains or blinds for indoor use on windows, sliding glass doors, or French doors. The purpose of such curtains or blinds is generally to attenuate the passage of light under very bright conditions and to serve as a sort of screen.

BACKGROUND OF THE INVENTION

The prior art discloses making mesh, for example, from two sheets of interwoven yarn, forming a cloth or fabric. The prior art meshes are often made from glass yarn coated with PAC and then woven, or from glass yarn woven and then coated with PAC. The PAC coating represents up to 60% of the total weight. The products obtained using these techniques are expensive, and moreover, in the event of a fire, the PAC emits toxic HCl. Regarding mesh products obtained by coating after weaving, the holes in the mesh are in general clogged in a random fashion. Inversely, in the case of products obtained by coating the glass yarn before weaving, the light is controlled by choosing the size of the gaps between the parallel strands of the different sheets, which makes it possible to determine the size of the holes, also called mesh. PAC coating makes the glass yarn opaque, such that the light does not pass through. One example of this type of product is the XL Screen 5% sold by Hexcel Fabrics (Villeurbanne, France).

Another known mesh consists of treating the glass yarn with a vinyl binder associated with polyurethane and a mineral filler. This treatment is inexpensive and makes it possible to treat the fabric as a whole once it is woven. In this case, the glass yarn is woven before treatment, and treated by padding. The padding technique makes it possible to deposit treatment compound on the yarn in a quantity corresponding to about 20 to about 30% of the total weight. Consequently, the yarn is less opaque. The yarn allows light to pass, which results in less control of the light attenuating ability of the mesh obtained in this manner. An example of this type of product is 1292 Fix 78 sold by Hexcel Fabrics (Villeurbanne, France). These products are mainly sold in the form of strips and are perfectly suited for making curtains composed of vertical strips. However, this type of product is not suitable for making rolling curtains or blinds (also know as roller blinds).

In the paint industry, it is common practice to add a $TiO_2$ type filler to increase paint opacity, but the transposition of this technique to the treatment of glass yarn mesh is not directly conceivable, given that $TiO_2$ damages glass fibers, which then break more easily, and are no longer strong enough to be bent or folded.

SUMMARY OF THE INVENTION

In this context, the present invention proposes producing a mesh made from glass yarn sheets that have a specific openness factor and present both satisfactory opacity and suitable mechanical resistance.

Another object of the present invention is to provide a mesh treated with a halogen-free compound, which meets environmental requirements.

The present invention also proposes providing a product that is easy to produce at a reasonable cost.

Moreover, the present invention aims to provide a mesh that can be easily rolled and can therefore be sold for making rolling curtains or blinds.

In this context, an object of the present invention is to produce a mesh intended for constituting a light attenuating screen, composed of not less than two sheets of glass yarn, joined to form a mesh with a specific openness factor and coated with a polymer coating containing $TiO_2$ particles, the glass yarn being separated from the $TiO_2$ particles by at least one layer of polymer binder.

BRIEF DESCRIPTION OF DRAWINGS

FIG. 1 graphically depicts the visible light transmittance rate (TV %) as a function of the lightness of the color (L measured by colorimeter) obtained for (i) a XL Screen 5% mesh, (ii) a 1292 Fix78 mesh, and (iii) an exemplary mesh of the present invention.

DETAILED DESCRIPTION OF THE INVENTION

In the meaning of the invention, the mesh of glass yarn can be made by weaving together two sheets of glass yarn (e.g., a warp of glass yarns and a weft of glass yarns). The mesh can also be made of two sheets of glass yarn superposed onto one another without being woven together, with the two sheets being bonded together in any other appropriate manner (e.g., an adhesive or other bonding agent). In both cases, the glass yarn strands are parallel to each other in each of the sheets and are separated by a constant or variable void. Suitable mesh and methods of making mesh are described, for example, in WO 99/43879, the subject matter of which is incorporated herein in its entirety. The strands cross, with or without being interwoven, so as to form an open mesh with a specific openness factor. Often the orientation of the yarn in each of the sheets is such that the strands cross at a 90° angle; however, it should be understood that orientations other than a 90° angle (e.g., a 45° angle) are also suitable in the present invention. The methods for producing such types of mesh are common knowledge to a person skilled in the art.

The openness factor, also known as the openness rate (OF), corresponds to the ratio of the surface area of the holes or voids to the total surface area of the mesh. This openness factor depends on the intended application and is preferably between about 2 and about 20%, and preferably on the order of about 5%. So-called technical mesh generally presents a lower openness factor and also lets less light pass through (at a constant openness rate) than so-called decorative mesh.

The term "coated" is used in the present invention to designate yarn that has a surface coating. The term "coated" does not exclude the fact that the coating may slightly impregnate the yarn. In other words, the coating, in this case, is both on the surface of the yarn and penetrates at least a portion of its thickness.

According to one of the essential characteristics of the present invention, the mesh of glass yarn is coated with a polymer coating containing $TiO_2$ particles, the glass yarn being separated from the $TiO_2$ particles by at least a portion of the polymer binder material in the polymer coating. Consequently, the yarn is both rendered opaque to facilitate light control and also is not in contact with the $TiO_2$, which protects it from damage. The $TiO_2$ particles provide opacity to the mesh and typically have, for example, an average particle diameter of less than about 100 μm, preferably less than about 20 μm. The coating advantageously represents, as a percentage of dry weight, from about 10 to about 33% of the total weight of the mesh.

The portion of the polymer layer separating the glass yarn from the $TiO_2$ particles must be sufficiently thick to protect the glass yarn from the titanium dioxide providing opacity. This layer portion preferably represents not less than about 4% of the total weight of the mesh.

In one exemplary embodiment of the present invention, the polymer coating contains (a) from about 90 to 100% by weight of (i) from about 5 to about 20% by weight of $TiO_2$; (ii) from about 25 to about 35% by weight of a fire retardant; and (iii) from about 50 to about 65% by weight of one or more polymer binders; and (b) from 0 to about 10% by weight of pigments (other than $TiO_2$). The different pigments make it possible to adjust the color to be imparted to the mesh.

The polymer coating used in the present invention is advantageously halogen-free, and therefore the use of pigments or fire retardants containing halogen is preferably avoided. As used herein, the term "halogen-free" means that the polymer coating does not contain any halogenated derivatives (e.g., fluorinated, brominated, chlorinated, or iodinated components).

Advantageously, the polymer coating contains, specifically as a binder, a mixture of (i) at least one of an acrylic binder and a vinyl binder and (ii) a polyurethane binder. The acrylic and vinyl binders together represent advantageously up to about 40% by weight of the total treatment, typically from about 15 to 40% by weight of the total treatment. The polyurethane binder(s) represent advantageously from about 5% to about 15% by weight of the total treatment, and in one preferred embodiment, about 13.44% by weight of the total treatment. The polyurethane binder (or binders) results in a mesh that better withstands folding, bending, and marking.

According to one preferred embodiment of the present invention, the polymer coating is multilayer, the layer directly in contact with the glass yarn is free of $TiO_2$, and the coating is in the form of not less than two layers, and advantageously three layers. When present, the three-layer coating desirably comprises:
  (a) one layer (a), referred to herein as a dyeing layer, on the surface of the yarn, which may impregnate the yarn to a certain depth, and is intended to contribute to the dyeing of the glass yarn constituting the mesh;
  (b) one layer (b), referred to herein as an intermediate protection layer, and is intended to protect the yarn constituting the mesh; and
  (c) layer (c), referred to herein as an opacity layer, constituting the external surface of the mesh, and is intended to render the glass yarn opaque.

Preferably, dyeing layer (a) represents, as a percentage of dry weight, from 0 to about 3% of the total weight of the mesh; protection layer (b) represents, as a percentage of dry weight, from about 6 to about 15% of the total weight of the mesh; and opacity layer (c) represents, as a percentage of dry weight, from about 4 to about 15% of the total weight of the mesh. The role of layer (c) is principally to provide opacity via the $TiO_2$. The role of layer (b) is principally to protect the glass yarn from the $TiO_2$ in layer (c). Layer (a) completes the dyeing process.

The present invention therefore proposes advantageously subjecting a mesh of glass yarn to three successive colored coating layers, the first treatment (a) imparting color, the second treatment (b) imparting color and protection, and the third treatment (c) imparting color and opacity. In some embodiments of the present invention, it is possible to eliminate first treatment (a).

Mesh according to the present invention can be made by conventional coating processes using padding, in other words, by soaking the mesh of glass yarn in a bath containing the treatment solution, then eliminating excess treatment solution using rollers (also referred to in the art as "foulards" or "pad mangles"). In some cases, this standard, conventional process step often results in obstruction of the holes or voids in the mesh. This is why a suction step is often used after the padding step. However, a suction step typically results in a significant loss of the products used in the treatment, causes problems when treating long lengths of fabric, and increases the risk of blemishes in the fabric.

To resolve this problem, another embodiment of the present invention proposes adding an anti-foaming agent to the bath treatments to eliminate obstruction in the mesh at least in part caused by (i) the viscosity of the bath, and/or (ii) the presence of surfactants in the bath. An anti-foaming agent enables the obstructions to be eliminated without the use of a suction process step. Any standard anti-foaming agent known to a person skilled in the art may be used advantageously, such as the family of polysiloxanes and specifically BYK®-094 sold by BYK Chemie (Wesel, Germany), or the family of polyether siloxane copolymers and specifically TEGO® Foamex 825 sold by DEGUSSA AG (Dusseldorf, Germany). Among the anti-foaming agents tested, BYK®-094 is particularly advantageous in the present invention.

Another object of the present invention is a process for manufacturing a mesh made of not less than two sheets of glass yarn, joined to form a mesh with a specific openness factor, composed of the following successive steps: applying a treatment (b) to the mesh followed by applying a treatment (c) to the mesh. The step of applying a treatment (b) to the mesh may comprise soaking the mesh in a bath containing, in % of total dry weight, from about 35 to about 55% of at least one vinyl binder; from about 5 to about 25% of at least one polyurethane binder; from about 20 to about 50% of at least one flame retardant; from about 0.5 to about 3% of at least one anti-foaming agent; and from 0 to about 0.5% of at least one pigment other than $TiO_2$, wherein treatment (b) is in the form of an emulsion or aqueous suspension whose dry weight represents about 27 to about 47% of the emulsion or aqueous suspension. The mesh treated in this fashion is then passed between two rollers and dried, to obtain a treatment layer (b) desirably representing, as a percentage of dry weight, from about 6 to about 15% of the total weight of the mesh.

The step of applying a treatment (c) to the mesh may comprise soaking the treated mesh obtained in the preceding step in a bath containing, in % of total dry weight, from about 25 to about 45% of at least one vinyl binder; from about 5 to about 25% of at least one polyurethane binder; from about 10 to about 30% of at least one flame retardant; from about 20 to about 40% titanium dioxide ($TiO_2$); from about 0.5 to about 3% of at least one anti-foaming agent; and from 0 to about 0.5% of at least one pigment other than $TiO_2$, wherein treatment (c) is in the form of an emulsion or aqueous suspension whose dry weight represents about 27 to about 47% of the emulsion or aqueous suspension. The mesh treated in this fashion is then passed between two rollers and dried, to obtain a treatment layer (c) representing, as a percentage of dry weight, from about 4 to about 15% of the total weight of the mesh.

The bath corresponding to treatment (b) desirably has, for example, a viscosity of between about 100 and about 300 cps (Brookfield type viscosimeter—measured at ambient temperature of 23±3° C. using spindle 4 and a speed setting of 100).

The bath corresponding to treatment (c) desirably has, for example, a viscosity of between about 200 and about 400 cps (Brookfield type viscosimeter—measured at ambient temperature of 23±3° C. using spindle 4 and a speed setting of 100).

In some embodiments of the present invention, treatment (b) will preferably be preceded by a treatment (a) performed by soaking the mesh in a bath containing from about 30 to about 99% pigment binder as a percentage of dry weight, and from about 1 to about 70% pigment as a percentage of dry weight, in the form of an emulsion or aqueous suspension whose dry weight represents from about 1 to about 5% of the emulsion or aqueous suspension. The mesh treated in this fashion is then passed between two rollers and dried. This bath desirably has, for example, a viscosity of between 0 and about 10 cps (Brookfield viscosimeter—measured at ambient temperature of 23±3° C. using spindle 4 and a speed setting of 100).

The baths corresponding to treatments (b) and (c) are in the form of an aqueous emulsion of polymer binders and contain surfactants designed to stabilize the emulsions and prevent sedimentation. The anti-foaming agent is therefore used in these last two treatment baths.

After each padding (i.e., soaking+passage through a padding assembly in which the roller spacing and pressure are adjusted depending the quantity of coating desired on the glass yarn), the mesh is subjected to a drying operation, generally at temperatures on the order of about 150 to about 170° C.

As for pigment binders used in treatment (a), suitable pigment binders include, but are not limited to, the family of acrylic binders and specifically PRINTOFIX® CFN (Clairant), HELIZARIN® FWT (BASF), LIANT ACM (Minerva), and vinyl binders, specifically UKANOL GT (Schill), LIANT 521 (Minerva).

As for vinyl binders used in treatments (b) and (c), suitable vinyl binders include, but are not limited to, vinyl acetate homopolymers, vinyl acetate copolymers, and more particularly ethylene vinyl acetate copolymers, specifically VINAMUL 3265, VINAMUL 1439, and VINAMUL 3301 made by the company Vinamul, or RHENAPPRET® VEA made by the company Thor.

As for polyurethane binders used in treatments (b) and (c), suitable polyurethane binders include, but are not limited to, aromatic polyurethanes and aliphatic polyurethanes. The latter are particularly preferred, especially RC 95871 made by the company Rota, RHENAPPRET® PUM made by the company Thor, and U210 made by the company Alberdingk.

As for fire retardants, suitable fire retardants include, but are not limited to, ammonium polyphosphates, such as FR CROS 481, 480, 485, 484, 486, 487, 489, made by the company Budenheim, or AP422 made by the company Clariant, or PHOSCHECK P30 made by the company Brenntag, melamine borate or melamine phosphate, such as BUDIT 310, 311, 312, 313, 314, or 315, made by the company Budenheim, zinc stannate, such as FLAMTARD H or FLAMTARD S made by the company Alcan, or zinc borate such as FLAMTARD Z10 or Z15 made by the company Borax. As discussed above, halogen-free fire retardants are preferred.

As used herein, the term "pigment" does not include $TiO_2$. All standard pigments used for dyeing glass fibers or yarn can be used in the present invention. Any commercially available $TiO_2$ pigment may be used in the present invention including, but not limited to, $TiO_2$ pigment commercially available under the trade designation TIOXIDE from (Huntsman), such as TIOXIDE TR92.

The mesh according to the present invention makes it possible to control the amount of light that passes therethrough, which depends essentially on the openness factor and the color of the mesh and therefore the lightness of the dye (usually known as "L"), but depends very little on the "transparency" of the yarn, which is sufficiently opaque.

The mesh according to the present invention also possesses good rolling properties. The rolling properties of a mesh can be determined according to the rolling test described below. In this test, a 1.5 m wide and 2.0 meter high piece of fabric is used. The blind is cut to precise dimensions, attached to a load bar weighing 800 g for each meter of length, and is mounted on a roller system comprising a tube having a tube diameter of 35 mm. The fabric is then wound (i.e., rolled) onto the tube.

The criteria used for determining good rolling properties are as follows: after rolling, if there is a cone (i.e., fabric distortion resulting in a portion of the fabric extending outward from a plane containing the fabric on the tube) of fabric on one of the sides of the tube, this cone must not exceed 5 mm in "height" and any non-parallelism of the load bar must not exceed 5 mm.

Moreover, the mesh according to the present invention comprising a treatment composed of polyurethane has good resistance to folding and bending.

The mesh according to the present invention is therefore perfectly suited for the constitution of light attenuating screens. It can be manufactured and rolled in wide widths. This mesh, manufactured in the form of rolls, can be used for the manufacture of rolling blinds or curtains. For rolling blinds or curtains, the mesh is associated with and/or attached to a roll-up bar, which desirably extends parallel to one of the sets of yarn strands constituting the mesh.

In a further exemplary embodiment of the present invention, the mesh has a first color and first coating composition on a first side of the mesh, and a second color and second coating composition on a second side of the mesh. The first color and first coating composition may be similar to or different from the second color and second coating composition. In this embodiment, at least one of the first and second coating compositions comprises a thickening agent that produces a highly pseudo-plastic coating composition. The highly pseudo-plastic coating composition has the advantage of setting very quickly once it is sheared. This prevents the highly pseudo-plastic coating composition from passing through to the other side of the mesh when the coating composition is being applied to one side of the mesh. The coated mesh may then be further coated on the opposite side to obtain a mesh have a different color on each side.

In this embodiment, the coating composition desirably comprises, in % dry weight, from about 15 to about 25% of at least one fire retardant, from about 40 to about 55% of $TiO_2$ white pigment, from about 15 to about 30% of at least one vinyl binder, from about 5 to about 15% of at least one polyurethane binder, and from about 2 to about 5% of at least one thickening agent, preferably an acrylic copolymer thickening agent. Any of the above-mentioned coating materials may be used to form the highly pseudo-plastic coating composition of this embodiment.

As for thickening agents, suitable thickening agents include, but are not limited to, acrylic copolymer thickening agents, such as COATEX DV 53, an acrylic copolymer thickening agent commercially available from Coatex SAS (Genay, France).

The coating composition may be applied as a paste or highly viscous solution, and then dried to remove any water and/or solvent (e.g., ammonia) from the coating composition. Typically, the coating composition is applied to the mesh to provide a coating layer having a coating weight ranging from about 5.0 to about 25 $g/m^2$, desirably, from about 15 to about 18 $g/m^2$.

The resulting mesh product is capable of passing the M1 fire classification test according to standard NFP 92503 and the B1 fire classification test according to standard 4102-1. The mesh products pass the B1 fire classification test if the products (i) pass the reaction to fire test (fire duct test) and (ii) meet the conditions for materials required by the B2 fire classification.

The coating resulting from application of the highly pseudo-plastic coating composition may be used alone or in combination with at least one of layer (a) and layer (b) described above. In other words, in some embodiments of the present invention, the coating resulting from application of the highly pseudo-plastic coating composition may be used in place of layer (c) described above. In other embodiments of the present invention, the coating resulting from application of the highly pseudo-plastic coating composition is used in combination with layer (b) described above without layer (a).

The examples below illustrate the present invention, but are not limitative in nature.

EXAMPLE 1

A mesh of glass yarn weighing 135 $g/m^2$ and having a 5% OF (a fabric produced by Hexcel Fabrics (Villeurbanne, France) and sold under reference 1292) was treated by a padding assembly with the baths 1, 2, and 3 described below on a Proctor brand processing line, at a speed of 12 m/min with the drying ovens set to 150° C. and the pressure applied by the padding assembly controlled by adjusters and set to 10.2. Drying time was on the order of about 2 minutes.
  Bath 1: GRAY—Quantities for 1 liter of bath
    HELIZARIN® Green BT (BASF)—0.10 g
    HELIZARIN® Gray BT96 (BASF)—0.65 g
    HELIZARIN® Black TT (BASF)—2.20 g
    Yellow Gold MINERPRINT (Minerva)—0.15 g
    Antifoam DC 544 (Dow Coming)—0.05 g
    HELIZARIN® FWT (BASF)—70.0 g
    TRITON® X155 (Dow)—5.0 g
    Water—1 liter
  Bath 2: GRAY—Quantities for 100 Kg of bath
    Water—36.4 Kg
    FR Cross 484 (Budenheim)—14.8 Kg
    VINAMUL 3265 (Vinamul)—18.8 Kg
    VINAMUL 1439 (Vinamul)—11.5 Kg
    RC 95871 (Rotta)—18.5 Kg
    BYK® 094 (BYK Chemie)—0.5 Kg
    HELIZARIN® Black TT (BASF)—0.1 Kg
    HELIZARIN® Blue RT94 (BASF)—0.035 Kg
    Red AGH (Holliday Dispersions)—0.025 Kg
  Bath 3: GRAY—Quantities for 100 Kg of bath
    Water—32.7 Kg
    PHOSCHECK P30 (Brenntag)—7.4 Kg
    White 51 (Minerva)—19.8 Kg
    RHENAPPRET VEA (Thor)—21.6 Kg
    RC 95871 (Rotta)—18.5 Kg
    BYK® 094 (BYK Chemie)—0.5 Kg
    HELIZARIN® Black TT (BASF)—0.1 Kg
    HELIZARIN® Blue RT94 (BASF)—0.035 Kg
    Red AGH (Holliday Dispersions)—0.025 Kg

EXAMPLE 2

Pigment Variation (to Produce Other Colors)

To obtain a treated mesh having a tan or beige color, the formulations in example 1 were modified by replacing the pigments used in baths 1, 2 and 3 of example 1 (i.e., HELIZARIN® Green BT (BASF), HELIZARIN® Gray BT96 (BASF), HELIZARIN® Black TT (BASF), Yellow Gold MINERPRINT (Minerva), HELIZARIN® Blue RT94 (BASF), and Red AGH (Holliday Dispersions)) with the following pigment formulation in each of the three baths:
  HELIZARIN® Dark Brown TT (BASF)—0.090 Kg
  HELIZARIN® Shiny Yellow RRT (BASF)—0.010 Kg
  Orange Imperon KGR (Hoechst)—0.007 Kg

EXAMPLE 3

Example 1 was repeated except the followed baths 1, 2, and 3 were used, and the padding assembly control setting was set to 9. Drying time was on the order of about 2 minutes.
  Bath 1: SILVER—Quantities for 1 liter of bath
    HELIZARIN® Gray BT96 (BASF)—0.20 g
    HELIZARIN® Dark Brown TT (BASF)—0.30 g
    Antifoam DC 544 (Dow Coming)—0.05 g
    PRINTOFIX CFN (Clariant)—70.0 g
    TRITON® X155 (Dow)—5 g
    Water q.s.p.—1 liter
  Bath 2: SILVER—Quantities for 100 Kg of bath
    Water—36.0 Kg
    FR Cross 484 (Budenheim)—16.0 Kg
    VINAMUL 3301 (Vinamul)—19.5 Kg
    VINAMUL 1439 (Vinamul)—11.0 Kg
    RC 95871 (Rotta)—17.5 Kg
    BYK® 094 (BYK Chemie)—1.0 Kg
    HELIZARIN® Gray BT96 (BASF)—0.20 g
    HELIZARIN® Dark Brown TT (BASF)—0.30 g
  Bath 3: SILVER—Quantities for 100 Kg of bath
    Water—38.0 Kg
    PHOSCHECK P30 (Brenntag)—10.3 Kg
    White 51 (Minerva)—14.0 Kg
    VINAMUL 3301 (Vinamul)—22.0 Kg
    RC 95871 (Rotta)—15.7 Kg
    BYK® 094 (BYK Chemie)—1.0 Kg
    HELIZARIN® Gray BT96 (BASF)—0.20 g
    HELIZARIN® Dark Brown TT (BASF)—0.30 g

EXAMPLE 4

A mesh of glass yarn weighing 151 $g/m^2$ and having a 3% OF (a fabric produced by Hexcel Fabrics (Villeurbanne, France) and sold under reference X4128) was treated by a padding assembly with baths 1, 2, and 3 as described in Example 3 above on a Proctor brand processing line, at a speed of 12 m/min with the drying ovens set to 150° C. and the pressure applied by the padding assembly controlled by adjusters and set to 8. Drying time was on the order of about 2 minutes.

EXAMPLE 5

A mesh of glass yarn weighing 135 g/m² and having a 5% OF (a fabric produced by Hexcel Fabrics (Villeurbanne, France) and sold under reference 1292) was treated by a padding assembly with baths 1 and 2 described above in Example 3 using a Proctor brand processing line, at a speed of 12 m/min with drying ovens set to 150° C. and the pressure applied by the padding assembly controlled by adjusters and set to 9. Drying time was on the order of 2 minutes.

The resulting mesh had a weight per unit area of between 150 and 160 g/m², and was then further coated as described below.

The mesh was coated on a rotary screen. A coating paste, described below, was applied onto the mesh by a hollow doctor blade positioned inside the rotary screen. The paste was pushed through the holes in the rotary screen by a metal rod of variable dimension, held inside the screen by magnetic pressure. The coated mesh was then dried in a forced air oven at an oven temperature of about 150° C. for about 2 minutes.

The rotary screen was a PIOLAT brand rotary screen having an opening percent of 12.5%, and a hole diameter of 70 μm. The treatment speed was 15 m/min. The rod was a ZIMMER brand ribbed rod having a diameter of 12 mm. The deposited coating weight was about 15 to about 18 g/m².

Bath 3: WRITE—Quantities for 100 Kg of bath
Water—55.0 Kg
DISPERBYK—1.0 kg
PHOSCHECK P30 (Brenntag)—5.4 Kg
VINAMUL 3301 (Vinamul)—11.4 Kg
RC 95871 (Rotta)—8,2 Kg
BYK® 094 (BYK Chemie)—1.5 Kg
TIOXIDE TR92—13.6 Kg
COATEX DV 53—3.4 Kg
Technical Ammonia—0.5 kg The viscosity of bath 3 was 60 cps (Brookfield viscosity using a Brookfield type viscosimeter—measured at ambient temperature of 23±3° C. using spindle 4 and a speed setting of 100).

The resulting mesh had an opaque color on one side of the mesh. In this example, the acrylic copolymer thickening agent resulted in a highly pseudo-plastic product coating composition, which had the advantage of setting very quickly once the coating composition was sheared. This shearing property prevented the coating from passing through to the other side of the mesh. The other side of the mesh was available for coating with a similar color or a different color.

Further, the resulting product was capable of passing the M1 fire classification test according to standard NFP 92503 and the B1 fire classification test according to standard 4102-1.

The visible light transmittance rate (TV %) of a given mesh is the proportion of visible light (400 to 800 mm wavelength) transmitted through the mesh. To measure TV %, a light meter (for example, LX102 Light Meter made by the company Lutron) is used to measure the quantity of light, expressed in lux, first on a light table equipped with a ground glass screen destined to provide diffuse lighting (by placing the cell of the light meter in contact with the ground glass screen) (Reading A), and then after placing the mesh between the ground glass screen and the light meter probe (Reading B). By dividing the second measurement (Reading B) by the first measurement (Reading A) and multiplying by 100, the proportion of light transmitted as a percentage is obtained.

L defines the lightness of a tint. L is defined by the CIE L*a*b* system. The three color coordinates X, Y, and Z are taken from the CIE standard table and only Y is transposed into L. L indicates a "perceived luminosity" or "lightness" —defined as a function of a psychophysical value (or chromatic value) selected in such as a way as to account for equal intervals between the colors related to this "lightness." The values of L are scaled from 0 to 100 degrees, with 0 for black and 100 for white. The CIE L*a*b diagram is often referred to as the "psychometric chromatic diagram." The colors are defined according to two coordinate axes at right angles. The plane defined in this manner is perpendicular to the achromatic axis. L is measured by means of a spectro-photocolorimeter.

FIG. 1 graphically depicts the visible light transmittance rate (TV %) as a function of the lightness, L, obtained for (i) a XL Screen 5% mesh, (ii) a 1292 Fix78 mesh, and (iii) an exemplary mesh of the present invention. The TV % curve as a function of L presented in FIG. 1 shows that mesh according to the present invention possess TV percentages similar to those of PAC-coated mesh disclosed in the prior art. This means that the TV % depends principally on the openness factor and the color of the mesh and therefore on L, and depends to a much lesser extent on the "transparency" of the yarn, as is true for prior art products such as 1292 Fix 78.

One criterion "$L_{10\%}$", the value of L for which TV %=10%, may be used to differentiate one mesh fabric from another. Typically, a higher "$L_{10\%}$" is desired. As shown in FIG. 1, the "$L_{10\%}$" values are as follows:
1292 Fix 78 "$L_{10\%}$"=48
Mesh according to the present invention "$L_{10\%}$"=64
XL-Screen 5% "$L_{10\%}$"=69

In one embodiment of the present invention, a mesh is considered to be satisfactory in terms of controlling the passage of light when "$L_{10\%}$">60.

What is claimed is:

1. A mesh suitable for use as a light attenuating screen, said mesh comprising not less than two sheets of glass yarn, joined to one another to form a mesh (i) having an openness factor of from about 2 to about 20% and (ii) coated with a first polymer coating containing $TiO_2$ particles, the glass yarn being separated from the $TiO_2$ particles by at least a portion of the first polymer coating, wherein the first polymer coating contains a mixture of (i) at least one of an acrylic binder and a vinyl binder and (ii) a polyurethane binder; and wherein the first polymer coating comprises not less than two layers comprising:
an opacity layer representing an external surface of the mesh; and
an intermediate protection layer between said mesh and said opacity layer.

2. The mesh of claim 1, wherein the first polymer coating comprises three layers, said three layers comprising:
a dyeing layer on a surface of the yarn;
the intermediate protection layer over the dyeing layer; and
the opacity layer representing an external surface of the mesh.

3. The mesh of claim 2, wherein the dyeing layer comprises, as a percentage of dry weight, from 0 to about 3% of a total weight of the mesh; the protection layer comprises, as a percentage of dry weight, from about 6 to about 15% of a total weight of the mesh; and the opacity layer comprises, as a percentage of dry weight, from about 4 to about 15% of a total weight of the mesh.

4. The mesh of claim 1, wherein the first polymer coating is halogen-free.

5. The mesh of claim 1, wherein the first polymer coating represents, as a percentage of dry weight, from about 10 to about 33% of a total weight of the mesh.

6. The mesh of claim 1, wherein the $TiO_2$ particles have an average diameter of less than about 100 μm.

7. The mesh of claim 1, wherein the first polymer coating contains:
   (i) from about 90 to 100% by weight of:
      from about 5 to about 20% by weight of $TiO_2$;
      from about 25 to about 35% by weight of a fire retardant, and
      from about 50 to about 65% of one or more polymer binders; and
   (ii) from 0 to about 10% by weight of pigments other than $TiO_2$.

8. The mesh of claim 1, wherein glass yarns in a first sheet of glass yarns are joined to glass yarns in a second sheet of glass yarns by weaving.

9. The mesh of claim 1, wherein the openness factor is from about 5 to about 20%.

10. A rolling blind or curtain comprising the mesh of claim 1 attached to a roll-up bar or curtain rod.

11. The mesh of claim 1, said mesh having a first side, and a second side opposite the first side with said first polymer coating on the first side of the mesh, said first polymer coating being halogen-free, wherein the second side of the mesh is substantially free of said first polymer coating.

12. The mesh of claim 11, further comprising a second polymer coating coated onto said second side, said second polymer coating being different from said first polymer coating.

13. The mesh of claim 11, wherein the mesh passes (i) a M1 fire classification test according to standard NFP 92503, (ii) a B1 fire classification test according to standard 4102-1, or (iii) both (i) and (ii).

14. A rolling blind or curtain comprising the mesh of claim 11 attached to a roll-up bar or curtain rod.

15. The mesh of claim 11, further comprising a second polymer coating coated onto said second side, said second polymer coating being halogen-free.

16. A rolling blind or curtain comprising the mesh of claim 15 attached to a roll-up bar or curtain rod.

17. The mesh of claim 11, further comprising a second polymer coating coated onto said second side, said second polymer coating containing $TiO_2$ particles, the glass yarn being separated from the $TiO_2$ particles by at least a portion of the second polymer coating.

18. The mesh of claim 1, said mesh having a first side, and a second side opposite the first side with said first polymer coating covering the first side, the second side, or both; wherein said mesh has a visible light transmittance of greater than zero.

19. The mesh of claim 18, wherein said mesh has a $L_{10\%}$ value of greater than 60.

20. A rolling blind or curtain comprising the mesh of claim 18 attached to a roll-up bar or curtain rod.

21. A mesh suitable for use as a light attenuating screen, said mesh comprising not less than two sheets of glass yarn, joined to one another to form a mesh (i) having an openness factor of from about 2 to about 20% and (ii) coated with a first polymer coating containing $TiO_2$ particles, the glass yarn being separated from the $TiO_2$ particles by at least a portion of the first polymer coating, wherein the first polymer coating contains a mixture of (i) at least one of an acrylic binder and a vinyl binder and (ii) a polyurethane binder, and wherein the first polymer coating comprises three layers, said three layers comprising:
   a dyeing layer on a surface of the yarn;
   an intermediate protection layer over the dyeing layer; and
   an opacity layer representing an external surface of the mesh.

22. The mesh of claim 21, wherein the dyeing layer comprises, as a percentage of dry weight, from 0 to about 3% of a total weight of the mesh; the protection layer comprises, as a percentage of dry weight, from about 6 to about 15% of a total weight of the mesh; and the opacity layer comprises, as a percentage of dry weight, from about 4 to about 15% of a total weight of the mesh.

23. The mesh of claim 21, wherein the first polymer coating is halogen-free.

24. The mesh of claim 21, wherein the first polymer coating represents, as a percentage of dry weight, from about 10 to about 33% of a total weight of the mesh.

25. The mesh of claim 21, wherein the $TiO_2$ particles have an average diameter of less than about 100 μm.

26. The mesh of claim 21, wherein the first polymer coating contains:
   (i) from about 90 to 100% by weight of:
      from about 5 to about 20% by weight of $TiO_2$;
      from about 25 to about 35% by weight of a fire retardant, and
      from about 50 to about 65% of one or more polymer binders; and
   (ii) from 0 to about 10% by weight of pigments other than $TiO_2$.

27. The mesh of claim 21, wherein glass yarns in a first sheet of glass yarns are joined to glass yarns in a second sheet of glass yarns by weaving.

28. The mesh of claim 21, wherein the openness factor is from about 5 to about 20%.

29. A rolling blind or curtain comprising the mesh of claim 21 attached to a roll-up bar or curtain rod.

30. The mesh of claim 21, said mesh having a first side, and a second side opposite the first side with said first polymer coating on the first side of the mesh, said first polymer coating being halogen-free, wherein the second side of the mesh is substantially free of said first polymer coating.

31. The mesh of claim 30, further comprising a second polymer coating coated onto said second side, said second polymer coating being different from said first polymer coating.

32. The mesh of claim 30, wherein the mesh passes (i) a M1 fire classification test according to standard NFP 92503, (ii) a B1 fire classification test according to standard 4102-1, or (iii) both (i) and (ii).

33. A rolling blind or curtain comprising the mesh of claim 30 attached to a roll-up bar or curtain rod.

34. The mesh of claim 30, further comprising a second polymer coating coated onto said second side, said second polymer coating being halogen-free.

35. A rolling blind or curtain comprising the mesh of claim 34 attached to a roll-up bar or curtain rod.

36. The mesh of claim 30, further comprising a second polymer coating coated onto said second side, said second polymer coating containing $TiO_2$ particles, the glass yarn being separated from the $TiO_2$ particles by at least a portion of the second polymer coating.

37. The mesh of claim 21, said mesh having a first side, and a second side opposite the first side with said first polymer coating covering the first side, the second side, or both; wherein said mesh has a visible light transmittance of greater than zero.

38. The mesh of claim 37, wherein said mesh has a $L_{10\%}$ value of greater than 60.

39. A rolling blind or curtain comprising the mesh of claim 37 attached to a roll-up bar or curtain rod.

* * * * *